(12) United States Patent
Roskind et al.

(10) Patent No.: US 9,838,353 B2
(45) Date of Patent: Dec. 5, 2017

(54) COMMUNICATION ACROSS NETWORK ADDRESS TRANSLATION

(71) Applicant: Google Inc., Mountain View, CA (US)

(72) Inventors: James Anthony Roskind, Redwood City, CA (US); Roberto Javier Peon, Palo Alto, CA (US)

(73) Assignee: Google LLC, Mountain View, CA (US)

(\*) Notice: Subject to any disclaimer, the term of this patent is extended or adjusted under 35 U.S.C. 154(b) by 259 days.

(21) Appl. No.: 14/070,371

(22) Filed: Nov. 1, 2013

(65) Prior Publication Data

US 2015/0127853 A1 May 7, 2015

(51) Int. Cl.
*G06F 15/16* (2006.01)
*H04L 29/12* (2006.01)

(52) U.S. Cl.
CPC ........ *H04L 61/2503* (2013.01); *H04L 61/256* (2013.01); *H04L 61/2553* (2013.01); *H04L 61/2514* (2013.01)

(58) Field of Classification Search
CPC ........... H04L 29/12066; H04L 61/1511; H04L 29/12009
USPC ........................................................ 709/245
See application file for complete search history.

(56) References Cited

U.S. PATENT DOCUMENTS

2007/0140159 A1\* 6/2007 Eronen .................. H04L 12/12
370/328
2007/0180081 A1 8/2007 Okmianski et al.
2011/0029682 A1\* 2/2011 Waters ................ H04L 12/4633
709/230
2013/0054762 A1 2/2013 Asveren
2013/0097329 A1 4/2013 Alex et al.

FOREIGN PATENT DOCUMENTS

WO WO-2012/018190 A2 2/2012

OTHER PUBLICATIONS

Roskind, Jim: "Multiplexed Stream Transport Over UDP", https://docs.google.com/document/d/1RNHkx_VvKWyWg6Lr8SZ-saqsQx7rFV-ev2jRFUoVD34/edit, Apr. 2012, pp. 1-50.

\* cited by examiner

*Primary Examiner* — Alan S Chou
(74) *Attorney, Agent, or Firm* — McDermott Will & Emery LLP

(57) ABSTRACT

A system and machine-implemented method for communicating with a client device. A server receives a first request by a client device via a first communication protocol, wherein the first request establishes a NAT binding which defines a communication path from a server to the client device. The server sends a response to the received first request via the first communication protocol, wherein the response is directed to the client device based on the NAT binding. The server determines that the response is unsuccessful in reaching the client device. In response to the determination, the server transmits a communication to the client device via a second communication protocol which is different than the first communication protocol, wherein the communication instructs the client device to re-establish the NAT binding.

23 Claims, 5 Drawing Sheets

COMMUNICATION ACROSS NETWORK ADDRESS TRANSLATION

BACKGROUND

The present disclosure generally relates to client-server communication, and in particular, to increased client-server connectivity when using network address translation (NAT).

Some protocols rely on NAT to dynamically create a reverse path for a server to respond to a client. When a NAT drops a temporary address translation binding, an external server may become unable to reach the client.

Thus, it may be desirable to have increased client-server connectivity when using NAT.

SUMMARY

The disclosed subject matter relates to a computer-implemented method of communicating with a client device. The method comprises receiving a first request by a client device via a first communication protocol, wherein the first request establishes a network address translation (NAT) binding which defines a communication path from a server to the client device, and sending a response to the received first request via the first communication protocol, wherein the response is directed to the client device based on the NAT binding. The method further comprises determining that the response is unsuccessful in reaching the client device, and transmitting, in response to the determination, a communication to the client device via a second communication protocol which is different than the first communication protocol, wherein the communication instructs the client device to re-establish the NAT binding.

The disclosed subject matter further relates to a system for communicating with a client device. The system comprises one or more processors, and a machine-readable medium comprising instructions stored therein, which when executed by the processors, cause the processors to perform operations comprising receiving a first request by a client device via a first communication protocol, wherein the first request establishes a NAT binding which defines a communication path from a server to the client device. The operations further comprise sending a response to the received first request via the first communication protocol, wherein the response is directed to the client device based on the NAT binding, and determining that the response is unsuccessful in reaching the client device. In addition, the operations comprise transmitting, in response to the determination, a communication to the client device via a second communication protocol which is different than the first communication protocol, wherein the communication instructs the client device to re-establish the NAT binding, and receiving a second request by the client device via the first communication protocol, wherein the second request re-establishes the NAT binding between the server and the client device.

The disclosed subject matter also relates to a machine-readable medium comprising instructions stored therein, which when executed by a system, cause the system to perform operations comprising receiving a first request by a client device via a first communication protocol, wherein the first request establishes a NAT binding which defines a communication path from a first server to the client device. The operations further comprise sending a response to the received first request via the first communication protocol, wherein the response is directed to the client device based on the NAT binding, and determining that the response is unsuccessful in reaching the client device. In addition, the operations comprise transmitting, in response to the determination, a communication to a second server for sending to the client device via a second communication protocol, wherein the second communication protocol is different than the first communication protocol, and wherein the communication instructs the client device to re-establish the NAT binding.

The disclosed subject matter also relates to a computer-implemented method of communicating with a server. The method comprises sending a first request, directed to a server, via a first communication protocol, wherein the first request establishes a NAT binding which defines a communication path from the server to a client device, and receiving a communication from the server via a second communication protocol which is different than the first communication protocol, wherein the communication indicates to re-establish the NAT binding. The method further comprises sending, in response to the received communication, a second request directed to the server via the first communication protocol, wherein the second request re-establishes the NAT binding.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Some protocols encapsulate stream data in user datagram protocol (UDP) packets. Such a stream may rely on NAT to dynamically create a reverse path for a server to respond to a client. When a NAT drops a temporary address translation binding, an external server may become unable to reach the client.

Thus, it is desirable to have a mechanism which can extend the period of time during which the server may respond, facilitate notification of the associated client of this connectivity loss, and more expeditiously allow for a connection to be re-established.

The subject disclosure provides for a server to communicate with a client device. A server receives a first request by a client device via a first communication protocol (e.g., encapsulating stream data in UDP packets). The first request establishes a NAT binding which defines a communication path from a server to the client device. The server sends a response to the received first request via the first communication protocol. The response is directed to the client device based on the NAT binding. The server determines that the response is unsuccessful in reaching the client device (e.g., due to a dropped NAT binding). In response to the determination, the server transmits a communication to the client device via a second communication protocol (e.g., transmission control protocol (TCP)) which is different than the first communication protocol. The communication instructs the client device to re-establish the NAT binding. In response, the client device sends a second request directed to server via the first communication protocol, thereby re-establishing the NAT binding between the client device and the server.

Figure 1:
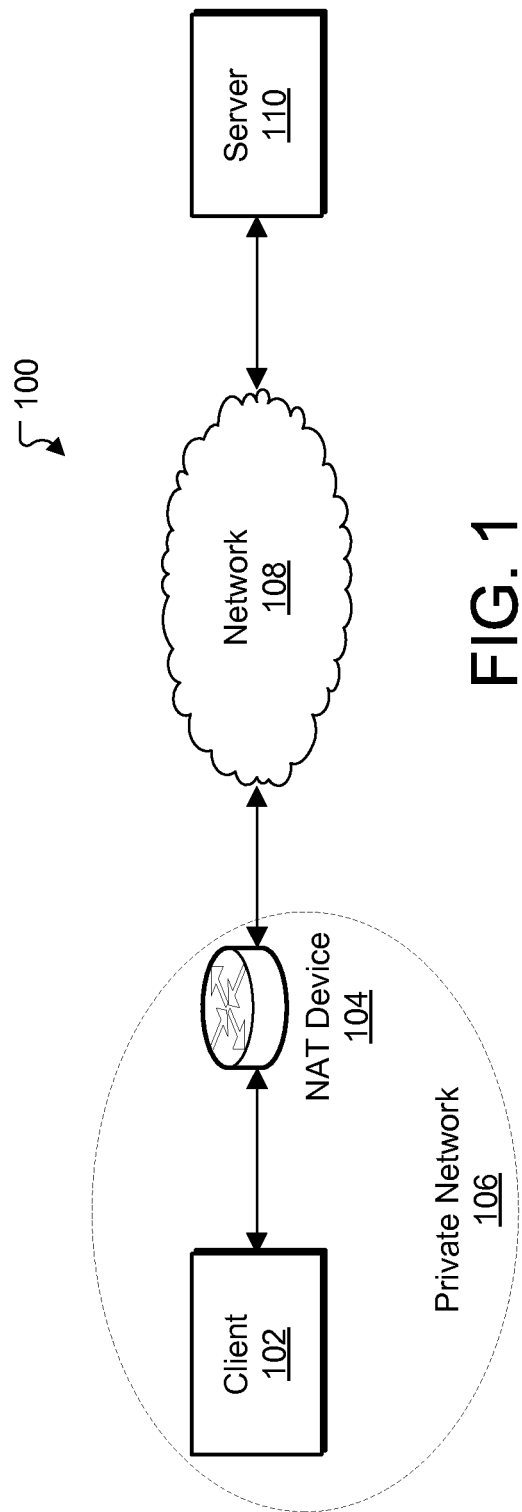
FIG. 1 illustrates an example network environment which can provide for communication between a client and a server.

FIG. 1 illustrates an example network environment which can provide for communication between a client and a server. Network environment 100 includes a client 102 within a private network 106, and a server 110. Client 102 and server 110 can communicate with each other through network 108.

While FIG. 1 illustrates a single device for client 102, the subject technology can apply to multiple clients (e.g., within private network 106) communicating with server 110. Client 102 and server 110 can send/receive data packets between each other, and can send/receive application software executed or stored on each other.

Client 102 can represent various forms of processing devices. Example processing devices can include a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of any these data processing devices or other data processing devices.

Server 110 can include one or more computing devices (e.g., one or more servers), and one or more computer-readable storage devices (e.g., one or more databases). Server 110 may be any system or device having a processor, a memory, and communications capability for providing content to the electronic devices (e.g., client 102). In some example aspects, server 110 can be a single computing device, for example, a computer server. In other embodiments, server 110 can represent more than one computing device working together to perform the actions of a server computer (e.g., cloud computing). Further, server 110 can represent various forms of servers including, but not limited to a web server, an application server, a proxy server, a network server, or a server farm.

In some aspects, network environment 100 can be a distributed client/server system that spans one or more networks, for example, network 108. Network 108 can be a large computer network, for example, a wide area network (WAN), the Internet, a cellular network, or a combination thereof connecting any number of mobile clients, fixed clients, and servers. Further, network 108 can include, but is not limited to, any one or more of the following network topologies, including a bus network, a star network, a ring network, a mesh network, a star-bus network, tree or hierarchical network, and the like. In some aspects, communication between client 102 and server 110 can occur via a virtual private network (VPN), Secure Shell (SSH) tunnel, or other secure network connection.

Client 102 can be part of a private network 106, for example, a local area network (LAN). Private network 106 can include a NAT device 104, which transmits a communication (e.g., a request) from client 102 to server 110 via network 108. In response to the communication (e.g., request) from client 102, server 110 can provide a response to NAT device 104 via network 108, for delivery to client 102. In example aspects, NAT device 104 is a network router.

With reference to NAT binding, NAT device 104 can prevent unsolicited inbound communications from reaching client device 102, for example, which is located behind NAT device 104 in the network (e.g., network 108). NAT device 104 allows inbound communications, such as IP packets, to reach client device 102 only if an existing packet flow already exists that matches the inbound packets. In general, a flow is defined with a source IP address, source port, destination IP address, destination port and protocol type (e.g., UDP, TCP). A flow is created by a packet sent from client device 102 (e.g., an endpoint) behind NAT device 104 to the network (e.g., network 108) for server 110.

When the initial packet sent from client device 102 reaches NAT device 104, NAT device 104 creates a binding associated with the packet. The binding maps the static, private IP address of client device 102 to a temporary public IP address selected by NAT device 104 from a pool of reusable IP addresses. Because NAT device 104 has a finite number of reusable IP addresses, a binding created by NAT device 104 can also be associated with a timeout value. If no packets that use the binding are received by NAT device 104 within the timeout window, then the binding is removed from NAT device 104 and the temporary IP address is returned to the pool for future use. In another example, removal of the NAT binding can take place because of resource constraints, such as having only a limited set of NAT bindings at any time, and having another request for a NAT binding that is more recent. Once the NAT binding is removed, the communication path (e.g., via the first communication protocol) from the server 110 to the client 102 is no longer valid.

In light of the foregoing, the subject disclosure provides for providing enhanced connectivity between client 102 and server 110. In this regard, server 110 receives a first request by a client device via a first communication protocol (e.g., encapsulating stream data in UDP packets). The first request establishes a NAT binding which defines a communication path from server 110 to client 102. Server 110 sends a response to the received first request via the first communication protocol. The response is directed to client 102 based on the NAT binding.

However, NAT device 104 may have removed the NAT binding (e.g., due to expiration of the timeout value and/or resource constraints). Server 110 determines that the response is unsuccessful in reaching client 102. For example, the server gets no response from its packet transmission for a sufficiently long time (such as several round-trip times, or several seconds, each corresponding to a preset threshold), or it retransmits the packet a plurality of times across an expanse of time (such as several seconds corresponding to a preset threshold), and gets no response. In response to the determination, server 110 transmits a communication to client 102 via a second communication protocol (e.g., a TCP channel) which is different than the first communication protocol. The communication instructs client 102 to re-establish the NAT binding. In response to receiving the communication from server 110, client 102 sends a second request directed to server 110 via the first communication protocol (e.g., encapsulating stream data in UDP packets), thereby re-establishing the NAT binding between client 102 and server 110.

Figure 2:
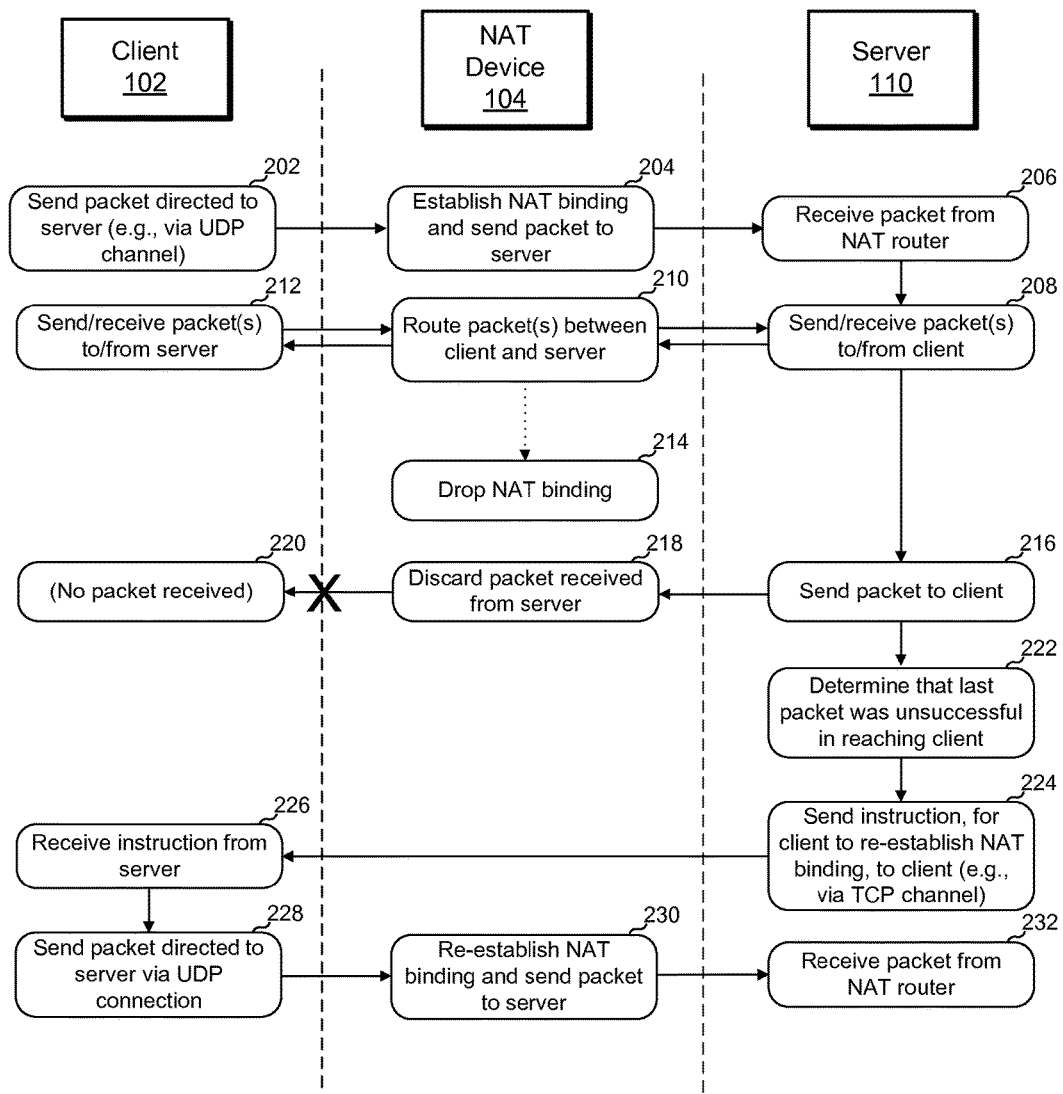
FIG. 2 illustrates an example process by which enhanced connectivity is provided between a client and a server using network address translation.

FIG. 2 illustrates an example process by which enhanced connectivity is provided between a client and a server using network address translation. Although FIG. 2 is described with reference to the network environment of FIG. 1, FIG. 2 is not limited to such and can apply to other network environments. At block 202, client 102 sends a packet directed to server 110 via a first communication protocol. For example, as an alternate to TCP, the first communication protocol can correspond to encapsulating stream data in UDP packets, such as the Quick UDP Internet Connections (QUIC) protocol.

More particularly, the first communication protocol can be a transport layer network protocol, such as QUIC, which supports a set of multiplexed connections between two endpoints over UDP. Such a protocol can provide security protection equivalent to transport layer security (TLS) or secure sockets layer (SSL), along with reduced connection and transport latency, and bandwidth estimation in each direction to avoid congestion. One goal of such a protocol can be to optimize connection-oriented web applications currently using TCP.

In example aspects, the first communication protocol can aim to be substantially equivalent to an independent TCP connection, but with reduced latency (e.g., with a goal of 0 round-trip time (RTT) connectivity overhead) and better handling of packet loss (e.g., reduced packet loss, and/or reduced need for retransmission when losses occur). For example, one reason for using the first communication protocol instead of TCP is that in TCP, the delay of a single packet delay can induce head-of-line blocking for an entire set of serially delivered packets, such as may occur with SPDY streams across a TCP connection. As an example, the first communication protocol's use of multiplexing streams across UDP, such as via QUIC, can provide out-of-order delivery (not supported in TCP), and limit the latency impact of a lost packet to the stream(s) that were using the lost packet.

Furthermore, RTTs are essentially fixed. In this regard, one way to decrease connection latency is to make fewer round-trips. The first communication protocol can be concentrated on reducing the round trips required when establishing a new connection, including the handshake step, encryption setup, and initial data requests. Clients (e.g., client 102) can, for example, include the session negotiation information in the initial packet. Servers (e.g., server 110), on the other hand, can publish a static configuration file to host some of this information. The client can store a resumption token (or other credentials) it received from the server, making subsequent connections to the same server with virtually zero latency (e.g., in the best case).

The first communication protocol can also handle packet loss well. Besides packet-level forward error correction, the first communication protocol can align cryptographic block boundaries with packet boundaries, so the impact of packet loss can be reduced. TCP may use congestion windows to avoid congestion, which may be unforgiving to multiplexed connections. However, in example aspects, the first communication protocol can employ packet pacing (e.g., with ongoing bandwidth estimation) and proactive speculative retransmission (e.g., sending duplicate copies of the most important packets, such as the ones containing error correction or initial encryption negotiation). In addition, the first communication protocol can allow higher level application protocols (e.g., SPDY header compression, such as may also be used in QUIC) to reduce or compress redundant data transmissions (e.g., headers).

Thus, with reference to FIG. 2, client 102 sends the packet for server 110, for example, using the first communication protocol described above. The first communication protocol may rely on NAT to dynamically create a reverse path for server 110 to respond to client 102. At block 204, NAT device 104 receives the packet from client 102, and establishes a NAT binding between client 102 and server 104. As noted above, the NAT binding maps the static, private IP address of client device 102 to a temporary public IP address selected by NAT device 104 from a pool of reusable IP addresses. The NAT device sends the packet (e.g., with the remapped address information) to server 110, and server 110 receives the packet at block 206.

Thus, after the NAT binding has been established, communication of packets between client 102 and server 110 can occur via the first communication protocol (e.g., encapsulating stream data in UDP packets), using NAT device 104 to route communication therebetween. FIG. 2 illustrates an example of this communication at blocks 208, 110 and 212.

However, in example aspects, server 110 may need to respond to the client after an extended period of time. For example, an extended period of time may be a time significantly larger than a RTT (e.g., 30 seconds, 60 seconds or longer). One example of such a request is an HTTP "hanging GET," where a request is made by client 102, but server 110 is deliberately slow to respond, so that it can signal when an unpredictable event has taken place. For example, if server 110 is hosting an online messaging application, an unpredictable event can correspond to a second user's status changing (e.g., to be online from offline, or vice versa, or idle, etc.).

Thus, NAT device 214 may drop the NAT binding at block 214 before server 110 has a chance to respond to a request (e.g., the first request, or a most recent request) by client 102. As noted above, NAT device 214 may drop the NAT binding due to expiration of a timeout value and/or resource constraints. The dropping of the NAT binding results in server 110 being unable to reach client 102 via the first communication protocol.

In example aspects, NAT bindings for UDP packets (e.g., corresponding to the first communication protocol), may be discarded preferentially to bindings for TCP traffic. For example, when a NAT device has a binding for both TCP and UDP ports (e.g., traffic), and a resource constraint requires some unbinding, some NAT devices (e.g., NAT device 104) will discard the UDP port NAT binding.

For some communication protocols, when a NAT device (e.g., NAT device 104) does an unbinding of a port, the NAT device will notify the source and/or destination of the stream conducted by the binding that it is performing the unbinding. For example, NAT devices may routinely notify senders of TCP packets of an unbinding by sending reset (e.g., RST) packets toward both endpoints. However, with UDP bindings (e.g., corresponding to the first communication protocol), it is difficult to notify the endpoints of an unbinding, since there is no notion of a stream and hence no way to inject packets to reset a stream.

Thus, at block 216, server 110 may unsuccessfully attempt to send a packet directed to client 102, after the NAT binding has been dropped. At block 218, NAT device 104 receives the packet from server 110, and discards the packet since the mapping to client 102 is no longer valid. Thus, the packet is not received by client 102 (e.g., see block 220).

At block 222, server 110 determines that the last packet was unsuccessful in reaching client 102. For example, a streaming protocol such as QUIC would, if a packet the last were received by client 102, routinely acknowledge the receipt of a packet by transmitting a response ACK packet to server 110. In that example, it is common for this response to arrive at server 110 within roughly one round-trip time (RTT) of the transmission of that last packet by server 110. When server 110 fails to receive an acknowledgement of that last packet, after a sufficient length of time (e.g., corresponding to a preset threshold), such as twice an RTT, or a period termed a retransmission-time-out (RTO), a server may retransmit that last packet a plurality of times. In that example, after a sufficient number of retransmissions by server 110, such as after 2 retransmissions with no responsive acknowledgement, a server may determine that the packet is not reaching the client 102.

At block 224, server 110 sends an instruction, via a second communication protocol, such as TCP, for client 102 to re-establish the NAT binding. Client 102 receives the instruction at block 226.

In example aspects, in addition to client 102 establishing a communication path via the first communication protocol (e.g., at block 202), client 102 may also establish a TCP connection to a second server. The second server can correspond to (e.g., be the same server as) server 110. Alternatively, the second server may be separate from and communicate with server 110. In example aspects, with reference to block 202, client 102 may utilize elements of the first communication protocol to expeditiously form the connection to server 110, make a request of server 110, and obtain a response, while creating the TCP connection to the second server (e.g., corresponding to server 110 or to a separate server).

Thus, with reference to blocks 216-226, when server 110 attempts to communicate with client 102 across the first communication protocol (e.g., encapsulating stream data in UDP packets), but fails to connect (e.g., due to a NAT unbinding), server 110 may use an alternate communications path to alert client 102 of the desire to communicate. For example, server 110 may send a message via the second server, across a TCP connection to client 102, alerting client 102 of the desire to communicate, and of the need for a NAT binding. For example, a single packet may be forwarded from server 110 to the second server, and from the second server to client 102 via TCP. In example aspects, the communications path from server 110 to the second server continuing to the client via TCP may include a packet corresponding to the first communication protocol (e.g., encapsulating stream data in UDP packets).

In response to the received instruction from server 110 via the TCP connection (e.g., via the second server), client device 102 sends a packet directed to server 110 via the first communication protocol (e.g., encapsulating stream data in UDP packets) at block 228. In other words, when client 102 is alerted of a desire by server 110 to communicate, client 102 may transmit traffic sufficient to re-establish a NAT binding.

For example, if there was already a connection via the first communication protocol from client 102 to server 110, the client 102 could send another packet via the first communication protocol to server 110, thereby re-establishing a NAT binding. In doing so, at block 230, NAT device 104 re-establishes the NAT binding and sends the packet to server 110. Server 110 receives the packet from NAT router 104 at block 232, and can resume communication with client 102 via the first communication protocol (e.g., as in blocks 208-212).

It should be noted that the second communication protocol is not limited to TCP. In example aspects, client 102, which makes a connection to server 110 via a first communication protocol (e.g., encapsulating stream data in UDP packets), may also identify an alternate communications path that may be used to reach client 102. For example, client 102 may provide an alternate address to reach client 102, such as an SMS phone number address, a voice phone number address, or a P2P address. In these examples, a server (e.g., server 110) may use an alternate communications path by sending messages to the alternate address, such as by sending an SMS message, by calling the voice phone number, or by sending a message to the P2P address. In the voice phone number example, one such communications path can include a modulated digital message sent over a voice channel, and decoded by a modem in client 102. In the SMS example, one such communications path can include an automated parsing and processing of the SMS message at client 102.

By virtue of using a first communication protocol (e.g., encapsulating stream data in UDP packets) and a second communication protocol (e.g., TCP, SMS, voice phone number, P2P), the low latency elements of the example first communication protocol (e.g., fast connections, minimal RTT, and large immunity to head of line blocking) can be maintained, while acquiring the benefit of NAT handling of other (e.g., TCP) connections (e.g., notification of both ends of a connection teardown, and preferential maintenance of the NAT binding). Low latency and increased robustness of connections can be realized. In addition, server push and notifications can be supported nicely by a combination of a guaranteed channel, plus a faster low latency channel.

In additional aspects, some users of UDP can send PING packets towards a server (e.g., server 110) to re-establish a NAT binding. For example, a client 102 may speculatively anticipate the chance of a NAT unbinding, and periodically send a packet to server 110 to maintain or re-establish a NAT binding. Alternatively, or in addition, some users of UDP can use control protocols (e.g., port control protocol (PCP)) to better control the NATs on the path. Alternatively, or in addition, a client (e.g., client 102) can agree with a server (e.g., server 110) about when the server will next try to communicate, and when that communication is not forth coming, the client may send a packet to the server to re-establish the binding.

Figure 3:
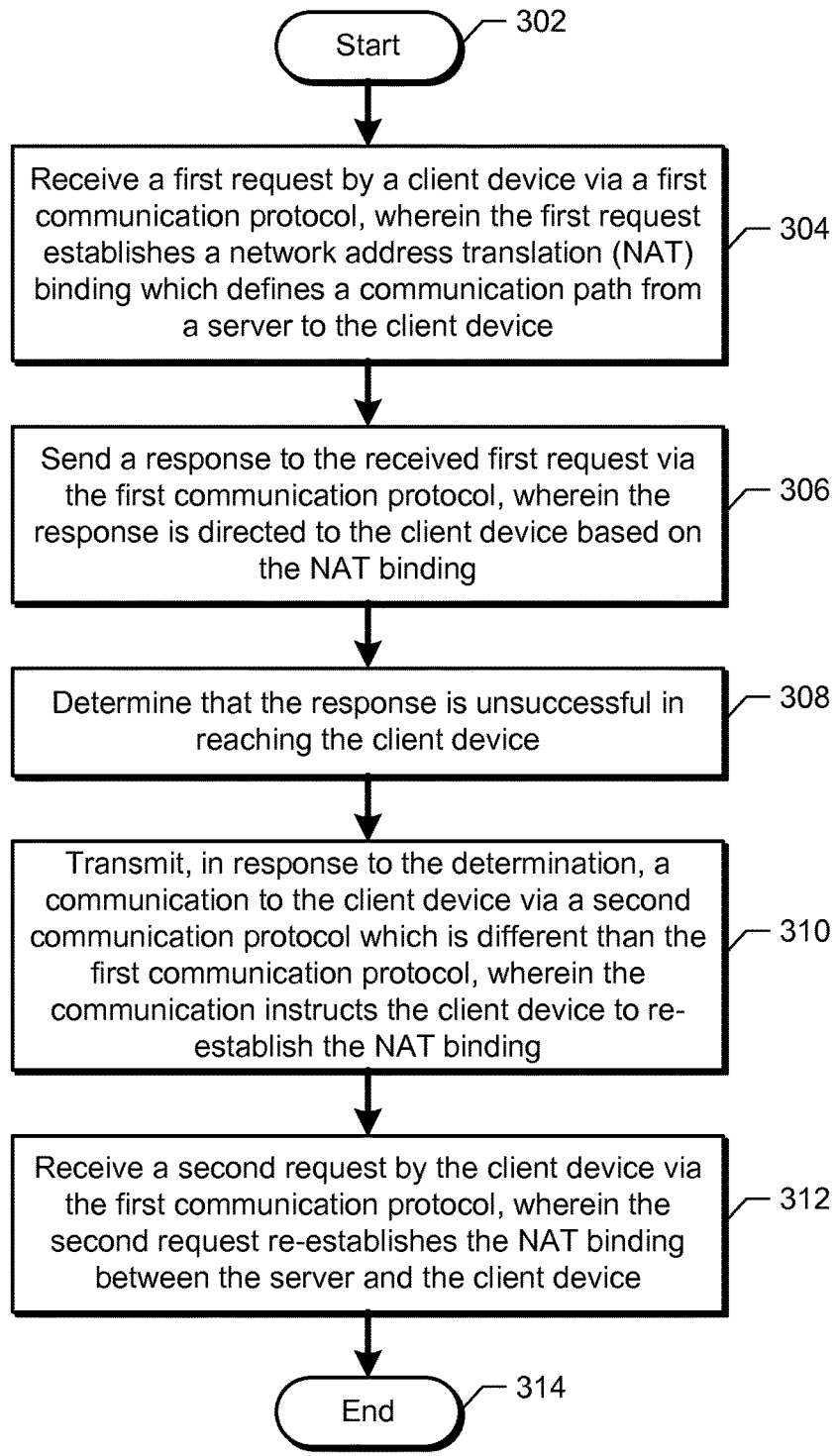
FIG. 3 illustrates an example process by a server for communicating with a client.

FIG. 3 illustrates an example process by a server for communicating with a client. Following start block 302, the server receives a first request by a client device via a first communication protocol at block 304. The first request establishes a NAT binding which defines a communication path from the server to the client device. The first communication protocol can correspond to encapsulating stream data in UDP packets.

At step 306, the server sends a response to the received first request via the first communication protocol, wherein the response is directed to the client device based on the NAT binding. At step 308, the server determines that the response is unsuccessful in reaching the client device.

The client device can be within a LAN, where the LAN includes a router for establishing the NAT binding. The router can remove the NAT binding after a preset time period. Determining that the response is unsuccessful in reaching the client device can be based on the unbinding.

At step 310, in response to the determination, the server transmits a communication to the client device via a second communication protocol which is different than the first communication protocol. The communication instructs the client device to re-establish the NAT binding. The second communication protocol can be TCP. Transmitting the communication can include transmitting the communication to a second server, where the second server sends the communication to the client device via the second communication protocol.

At step 312, the server receives a second request by the client device via the first communication protocol. The second request re-establishes the NAT binding between the server and the client device. The process then ends at end block 314.

Figure 4:
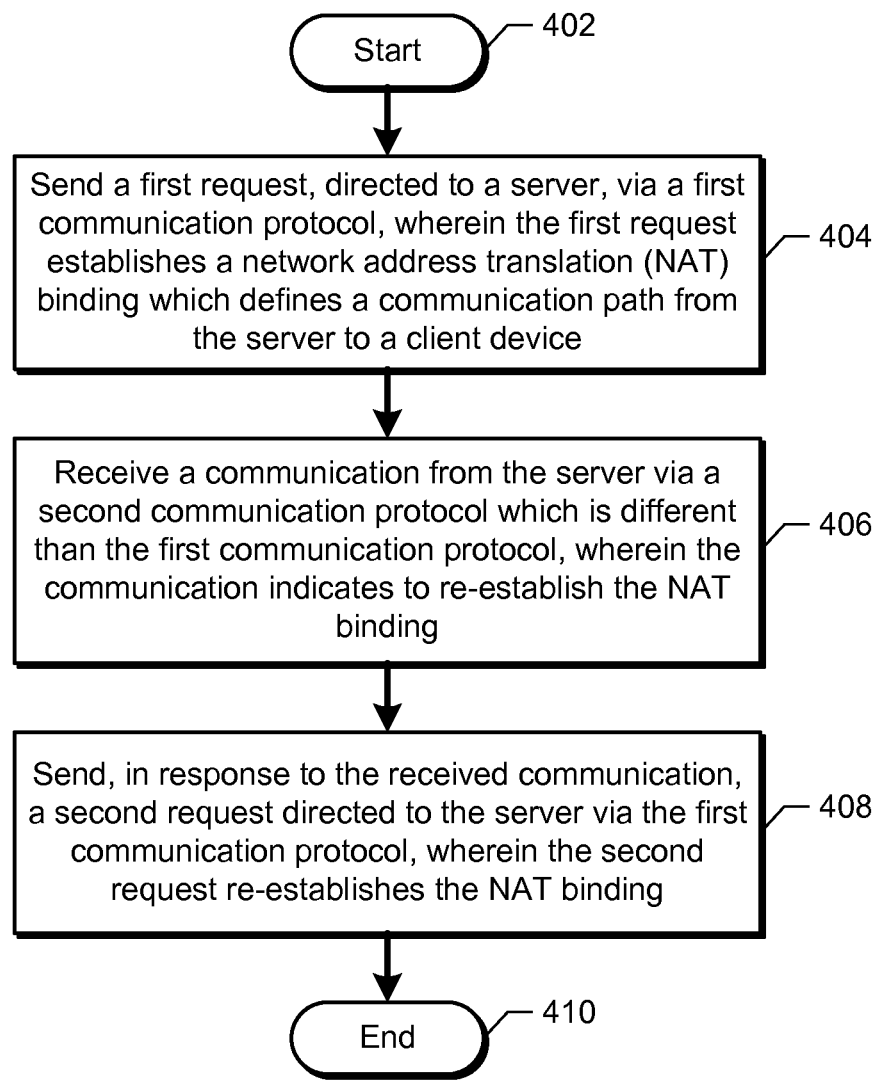
FIG. 4 illustrates an example process by a client for communicating with a server.

FIG. 4 illustrates an example process by a client device for communicating with a server. Following start block 402, the client device sends a first request, directed to a server, via a first communication protocol at step 404. The first request establishes a network address translation (NAT) binding which defines a communication path from the server to a client device. The first communication protocol can correspond to encapsulating stream data in UDP packets.

At step 406, the client device receives a communication from the server via a second communication protocol which is different than the first communication protocol. The communication indicates to re-establish the NAT binding. The second communication protocol can be TCP.

The client device can be within a LAN, where the LAN includes a router for establishing and re-establishing the NAT binding. The router can remove the NAT binding after a preset time period. Receiving the communication from the server can be in response to the unbinding. The communication can be received from the server via a second server which communicates with the client device via the second communication protocol.

At step 408, in response to the received communication, the client sends a second request directed to the server via the first communication protocol, wherein the second request re-establishes the NAT binding. The process then ends at end block 410.

Figure 5:
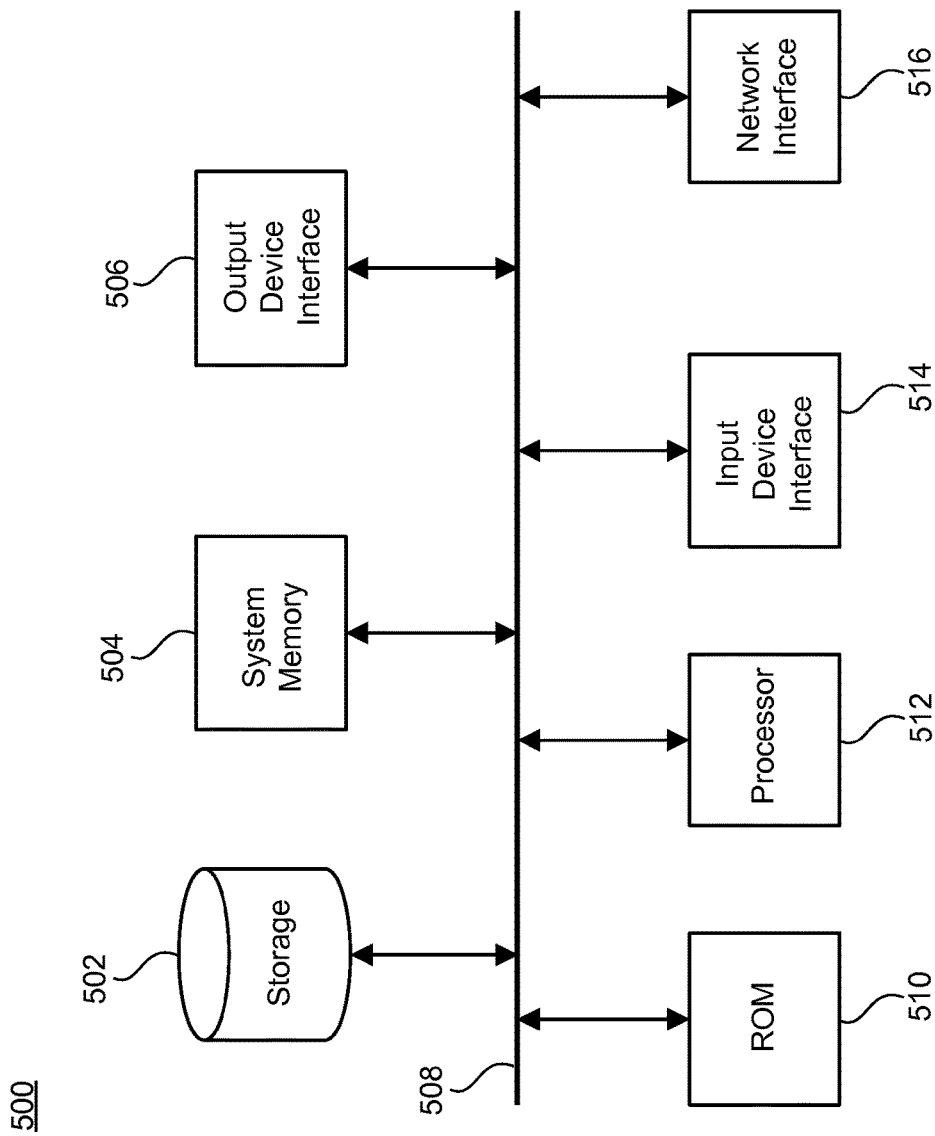
FIG. 5 conceptually illustrates an example electronic system with which some implementations of the subject technology can be implemented.

FIG. 5 conceptually illustrates an example electronic system with which some implementations of the subject technology can be implemented. Electronic system 500 can be a computer, phone, PDA, or any other sort of electronic device. Such an electronic system includes various types of computer readable media and interfaces for various other types of computer readable media. Electronic system 500 includes a bus 508, processing unit(s) 512, a system memory 504, a read-only memory (ROM) 510, a permanent storage device 502, an input device interface 514, an output device interface 506, and a network interface 516.

Bus 508 collectively represents all system, peripheral, and chipset buses that communicatively connect the numerous internal devices of electronic system 500. For instance, bus 508 communicatively connects processing unit(s) 512 with ROM 510, system memory 504, and permanent storage device 502.

From these various memory units, processing unit(s) 512 retrieves instructions to execute and data to process in order to execute the processes of the subject disclosure. The processing unit(s) can be a single processor or a multi-core processor in different implementations.

ROM 510 stores static data and instructions that are needed by processing unit(s) 512 and other modules of the electronic system. Permanent storage device 502, on the other hand, is a read-and-write memory device. This device is a non-volatile memory unit that stores instructions and data even when electronic system 500 is off. Some implementations of the subject disclosure use a mass-storage device (for example, a magnetic or optical disk and its corresponding disk drive) as permanent storage device 502.

Other implementations use a removable storage device (for example, a floppy disk, flash drive, and its corresponding disk drive) as permanent storage device 502. Like permanent storage device 502, system memory 504 is a read-and-write memory device. However, unlike storage device 502, system memory 504 is a volatile read-and-write memory, such a random access memory. System memory 504 stores some of the instructions and data that the processor needs at runtime. In some implementations, the processes of the subject disclosure are stored in system memory 504, permanent storage device 502, or ROM 510. For example, the various memory units include instructions for providing connectivity between a client and a server. From these various memory units, processing unit(s) 512 retrieves instructions to execute and data to process in order to execute the processes of some implementations.

Bus 508 also connects to input and output device interfaces 514 and 506. Input device interface 514 enables the user to communicate information and select commands to the electronic system. Input devices used with input device interface 514 include, for example, alphanumeric keyboards and pointing devices (also called "cursor control devices"). Output device interfaces 506 enables, for example, the display of images generated by the electronic system 500. Output devices used with output device interface 506 include, for example, printers and display devices, for example, cathode ray tubes (CRT) or liquid crystal displays (LCD). Some implementations include devices, for example, a touchscreen that functions as both input and output devices.

Finally, as shown in FIG. 5, bus 508 also couples electronic system 500 to a network (not shown) through a network interface 516. In this manner, the computer can be a part of a network of computers (for example, a local area network ("LAN"), a wide area network ("WAN"), or an Intranet, or a network of networks, for example, the Internet. Any or all components of electronic system 500 can be used in conjunction with the subject disclosure.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example, microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example, is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example, application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending webpages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

What is claimed is:

1. A computer-implemented method of communicating with a client device, the method comprising:
   receiving a first request from a client device via a first communication protocol, the first request establishing a network address translation (NAT) binding which defines a first communication path from a server to the client device;
   receiving a second request from the client device via a second communication protocol different from the first communication protocol, the second request establishing a second communication path from the server to the client device, the second communication path for the second communication protocol being established while the NAT binding for the first communication protocol is being established;
   sending a response to the received first request via the first communication protocol, the response being directed to the client device based on the NAT binding;
   determining, on the server, that the response is unsuccessful in reaching the client device;
   sending, in response to the determination that the response is unsuccessful in reaching the client device, a communication to the client device via the second communication protocol, the communication sent via the second communication protocol comprising a packet corresponding to encapsulated stream data in a user datagram protocol packet to instruct the client device to re-establish the NAT binding; and
   receiving, in response to the communication sent via the second communication protocol, a second request from the client device via the first communication protocol, wherein the NAT binding between the server and the client device is reestablished based on the second request.

2. The method of claim 1, wherein the first communication protocol corresponds to encapsulating stream data in user datagram protocol (UDP) packets.

3. The method of claim 1, wherein the second communication protocol is transmission control protocol (TCP).

4. The method of claim 1, wherein the client device is within a local area network (LAN), and wherein the LAN comprises a router for establishing the NAT binding.

5. The method of claim 4, wherein the router removes the NAT binding after a preset time period.

6. The method of claim 5, wherein determining that the response is unsuccessful in reaching the client device is based on the removed NAT binding.

7. The method of claim 1, wherein sending the communication comprises transmitting the communication to a second server, wherein the second server sends the communication to the client device via the second communication protocol.

8. The method of claim 1, wherein:
   the response is sent over the first communication path associated with the first communication protocol, and
   the communication is provided for transmission over a second communication path associated with the second communication protocol.

9. The method of claim 8, wherein the second communication path is independent of the NAT binding.

10. The method of claim 1, wherein the communication is provided for transmission to the client device via a second server communicably coupled to the client device using the second communication protocol.

11. The method of claim 1, wherein determining, on the server, that the response is unsuccessful in reaching the client device further comprises:
    determining that a first acknowledgement of receipt of a last packet of the response to the received first request was not received from the client device;
    sending, responsive to determining that the first acknowledgement was not received by the client device, the last packet of the response to the received first request to the client device;
    determining that a second acknowledgement of receipt of the last packet of the response to the received first request was not received from the client device;
    sending; responsive to determining that the second acknowledgement was not received by the client device, the last packet of the response to the received first request to the client device; and
    determining that a third acknowledgement of receipt of the last packet of the response to the received first request was not received from the client device.

12. A system for communicating with a client device, the system comprising:
    one or more processors; and
    a machine-readable medium comprising instructions stored therein, which when executed by the processors, cause the processors to perform operations comprising:

receiving a first request from a client device via a first communication protocol, the first request establishing a network address translation (NAT) binding which defines a communication path from a server to the client device;

receiving a second request from the client device via a second communication protocol different from the first communication protocol, the second request establishing a second communication path from the server to the client device, the second communication path for the second communication protocol being established while the NAT binding for the first communication protocol is being established;

sending a response to the received first request via the first communication protocol, the response being directed to the client device based on the NAT binding;

determining, on the server, that the response is unsuccessful in reaching the client device;

sending, in response to the determination, a communication to the client device via the second communication protocol, the communication sent via the second communication protocol comprising a packet corresponding to encapsulated stream data in a user datagram protocol packet to instruct the client device to re-establish the NAT binding; and receiving, in response to the communication sent via the second communication protocol, a second request from the client device via the first communication protocol, the NAT binding between the server and the client device being reestablished based on the second request.

13. The system of claim 12, wherein the first communication protocol corresponds to encapsulating stream data in user datagram protocol (UDP) packets.

14. The system of claim 12, wherein the second communication protocol is transmission control protocol (TCP).

15. The system of claim 12, wherein the client device is within a local area network (LAN), and wherein the LAN comprises a router for establishing the NAT binding.

16. A non-transitory machine-readable medium comprising instructions stored therein; which when executed by a system, cause the system to perform operations comprising:

receiving a first request from a client device via a first communication protocol, the first request establishing a network address translation (NAT) binding which defines a communication path from a first server to the client device;

receiving a second request from the client device via a second communication protocol different from the first communication protocol, the second request establishing a second communication path from the first server to the client device, the second communication path for the second communication protocol being established while the NAT binding for the first communication protocol is being established;

sending a response to the received first request via the first communication protocol, the response being directed to the client device based on the NAT binding;

determining, on the first server, that the response is unsuccessful in reaching the client device; and sending, in response to the determination, a communication to a second server for transmission to the client device through the second server via the second communication protocol, the communication sent via the second communication protocol comprising a packet corresponding to the first communication protocol to instruct the client device to re-establish the NAT binding, the second server being different than the first server.

17. A computer-implemented method of communicating with a server, the method comprising:

sending a first request, directed to a server, via a first communication protocol, the first request establishing a network address translation (NAT) binding which defines a communication path from the server to a client device;

sending a second request from the client device via a second communication protocol different from the first communication protocol, the second request establishing a second communication path from the server to the client device; the second communication path for the second communication protocol being established while the NAT binding for the first communication protocol is being established;

receiving, on the client device, a communication from the server via the second communication protocol, the communication received via the second communication protocol comprising a packet corresponding to encapsulated stream data in a user datagram protocol packet to instruct the client device to re-establish the NAT binding between the client device and the server; and sending, in response to the received communication from the server, a third request directed to the server via the first communication protocol, the NAT binding being reestablished based on the third request.

18. The method of claim 17, wherein the first communication protocol corresponds to encapsulating stream data in user datagram protocol (UDP) packets.

19. The method of claim 17, wherein the second communication protocol is transmission control protocol (TCP).

20. The method of claim 17, wherein the client device is within a local area network (LAN), and wherein the LAN comprises a router for establishing and re-establishing the NAT binding.

21. The method of claim 20, wherein the router removes the NAT binding after a preset time period.

22. The method of claim 21, wherein receiving the communication from the server is in response to the removed NAT binding.

23. The method of claim 17, wherein the communication is received from the server via a second server which communicates with the client device via the second communication protocol.

* * * * *